Figure 1:
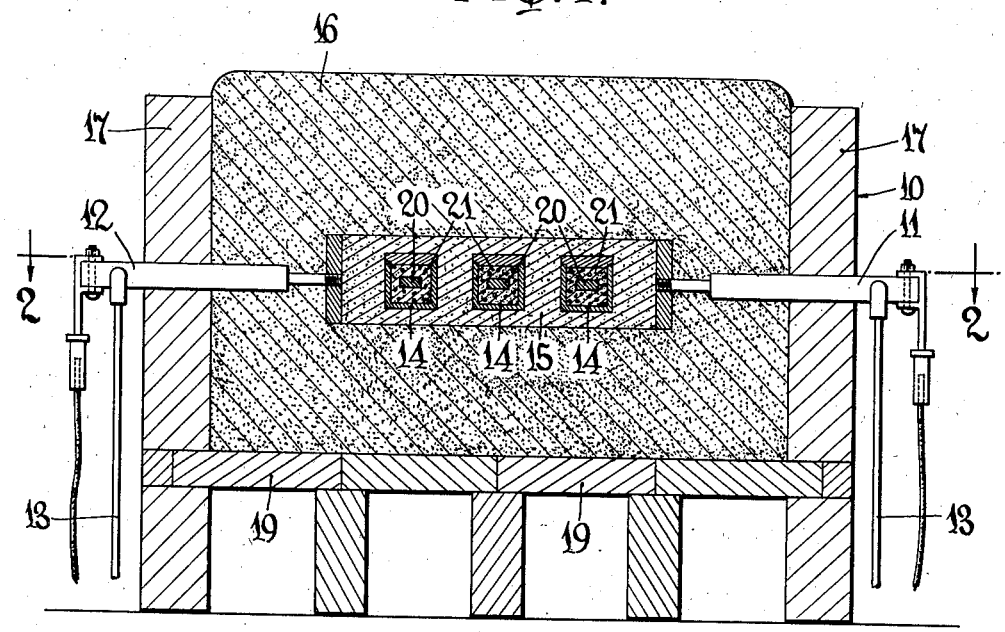

Nov. 30, 1943.  E. WAINER  2,335,325

METHOD OF MAKING ZIRCONIUM OXIDE REFRACTORIES

Filed Jan. 19, 1942

INVENTOR
Eugene Wainer,
BY
Bean, Brooks, Buckley & Bean.
ATTORNEYS

Patented Nov. 30, 1943

2,335,325

UNITED STATES PATENT OFFICE 2,335,325

METHOD OF MAKING ZIRCONIUM OXIDE REFRACTORIES

Eugene Wainer, Niagara Falls, N. Y., assignor to The Titanium Alloy Manufacturing Company, New York, N. Y., a corporation of Maine Application January 19, 1942, Serial No. 427,282

12 Claims. (Cl. 25—156)

This invention relates to zirconium oxide or zirconia refractories and the method of making the same.

In the field of special refractory materials, zirconium dioxide has long been of primary interest for several reasons, such as its extremely high melting point (approximately 2750° C.) and its chemical inertness in the presence of fluid slags differing widely in chemical nature. One difficulty, however, with the use the zirconia as a refractory material is the fact that it may exist in more than one crystalline modification. Of primary interest is the allotropic change taking place at 1000 to 1050° C., the transfer being from the monoclinic system to the hexagonal on the rising temperature scale, such allotropic change being accompanied by a sudden volume change of approximately 1%. This sudden volume change is usually sufficient to completely disrupt a necessarily tight structure such as a refractory. Normally the structural failure can be obviated by passing through the temperature range involving the allotropic change with extreme slowness, a completely undesirable practice commercially, particularly since such failure will take place in actual use. In my copending application, Serial No. 330,373, a method and composition was given to surmount the disruption normally encountered because of this volume change.

In accordance with the present invention, further novel means are provided for making zirconia ware which permanently eliminates the disruption due to the volume change normally taking place at 1000° to 1050° C. The present invention is also a distinct aid in obtaining vitrification in a substantially pure zirconia body, and in forming an almost completely non-porous body highly resistant to thermal shock. It may be used with the slip casting and jiggering processes and compositions described in my copending applications, Serial Nos. 330,373 and 427,281, the latter filed of even date herewith. It may also be used with other well known methods of ceramic formation, such as ramming, pressing, soft mud working, etc.

The invention generally comprises molding or shaping a suitable zirconia composition, drying the shaped body and firing in a reducing atmosphere. In the preferred form of the invention, a small amount of a siliceous bonding agent is incorporated in the composition, which further assists in preventing disruption at 1000° to 1050° C., in maintaining a coherent body during firing, and in securing maximum vitrification.

The preferred form of zirconium oxide for use in this invention is electrically fused zirconia, which is crushed or milled to the required size. A variety of mesh sizes may be used. For example, in slip casting or jiggering, combinations of sizes from minus 325 mesh up to minus 40 mesh may be used, while for pressing or ramming relatively coarser sizes up to minus ¼ inch may be used. Other types of zirconia may also be used, such as those formed by calcination of hydrated zirconia or zirconium hydroxide or salts of zirconium such as the carbonates, chlorides, sulfates, oxysulfates, nitrates, etc. When these materials are calcined to at least 1300° C. and preferably to 1400° C., they are suitable for use in the present invention. Impure natural zirconia such as baddeleyite may also be used. All these zirconias, particularly electrically fused zirconia, exhibit the volume change due to allotropic change in crystal structure at 1000° to 1050° C.

Any of the above types of zirconium oxide may be mixed with other substances, including water, deflocculating agents, bonding agents, or other modifying agents for specific purposes. Thus, for slip casting or jiggering, the defloccuating agents and procedures described in copending applications, Serial Nos. 330,373 and 427,281, the latter filed of even date herewith, may be used. For ramming or pressing or slop molding a 2% gelatin or dextrine solution may be used as a temporary bond for green strength. The composition thus formed is molded to the required shape by any of the methods well known in the refractory art, such as slip-casting, slop molding, jiggering, ramming, pressing and soft mud working. The shapes are dried in customary fashion and are then ready to be fired.

The essential part of the firing procedure, as stated above, is carried out in a reducing atmosphere. The preferred reducing agent is an atmosphere containing a carbonaceous gas or gases, particularly carbon monoxide or hydrocarbons or mixtures thereof. The firing should take place at a temperature in excess of 1900° C., and preferably below 2400° C., particularly where siliceous bonding agents are employed. It is not necessary or even desirable that the atmosphere be strongly reducing, but only that these free reducing agents be present to at least a slight extent at all times. In fact, a strongly reducing atmosphere is somewhat undesirable. When fired in an atmosphere of carbonaceous gases, zirconium oxide decomposes to form a small amount of zirconium carbide. A large amount of zirconium carbide in the fired product is positively harmful, for reasons hereinafter pointed out.

Although the reducing firing may be carried out in fuel fired equipment, the high temperature involved makes this procedure of academic interest only. The firing is preferably carried out in an electric furnace of the type where heat is developed by the resistance offered by the passage of high voltage current through a current-conducting core. The conductors for this type of furnace normally contain preponderating amounts of carbon, and consequently the core is usually saturated with carbonaceous vapors. Even though the zirconium oxide being fired is not in direct contact with solid carbon, enough carbon will be absorbed so as to produce a substantial proportion of zirconium carbide. On subsequent calcination the zirconium carbide is transformed into low density zirconium oxide which disrupts the refractory shape completely. The formation of zirconium carbide is more rapid the higher the temperature, the greater the concentration of carbonaceous gases, and the greater the concentration of solid carbon or carbides immediately surrounding the zirconium oxide.

I have found, however, that the formation of a very small amount of zirconium carbide, or the absorption of a small amount of carbon by the zirconium oxide, up to a certain limit, is highly beneficial in promoting maturation and vitrification of the ware, and in the initial firing operation prevents the disruption due to volume change. The desirable upper limit is about 0.2% carbon, present either as zirconium carbide or absorbed carbon. Below this amount, the ware will not be disrupted on subsequent oxidation, and yet there is sufficient carbon or carbide present to promote the maturation of the ware. The formation of this amount is accomplished and the formation of a larger amount prevented by embedding the zirconium oxide pieces in a mass of material filling the interior of the core of the furnace. This embedding material should have the property of actively absorbing, or combining with, carbon entering or originating in the core either in the form of a carbonaceous gas, or solid carbon deposited by cracking of carbonaceous gas or decomposition of carbides, and still allow the passage of a small amount of reducing gas into the interior of the mass.

The embedding material which best accomplishes this purpose is finely divided zirconia of a relatively pure nature, e. g., containing 94 to 97% $ZrO_2$, 5% or less $SiO_2$ and less than 1% $Fe_2O_3$, $TiO_2$, and other impurities. Zirconia wholly coarser than 100 mesh size is too porous towards the passage of carbon through the mass, so embedding zirconium oxide of 100 mesh size or finer, or a combination of fine and coarse particles, is used so as to constitute a relatively tight barrier. In this state carbon is quickly absorbed, allowing only a small amount to pass into the interior. Zirconium oxide is particularly satisfactory because neither zirconium oxide nor zirconium carbide will fuse or sinter sharply when heated to the firing temperature of the zirconia refractory shape. Furthermore, by merely calcining under oxidizing conditions, $ZrO_2$ suitable for re-use may be recovered.

In view of the expense involved in the use of $ZrO_2$ as an embedding material, it is preferred to accomplish the firing in square or rectangular carbon saggers, which form part of the core carrying the current, these saggers making the subsequent recovery of the embedding $ZrO_2$ an easy operation. In such a sagger the zirconia pieces are placed so that they are separated from the perpendicular portions of the carbon sagger wall by at least 1½ inches of embedding $ZrO_2$ and from all horizontal portions of the carbon sagger wall (bottom and top cover) by at least 3 inches. These carbon saggers are surrounded on all four sides by the current carrying core proper.

Figure 2:
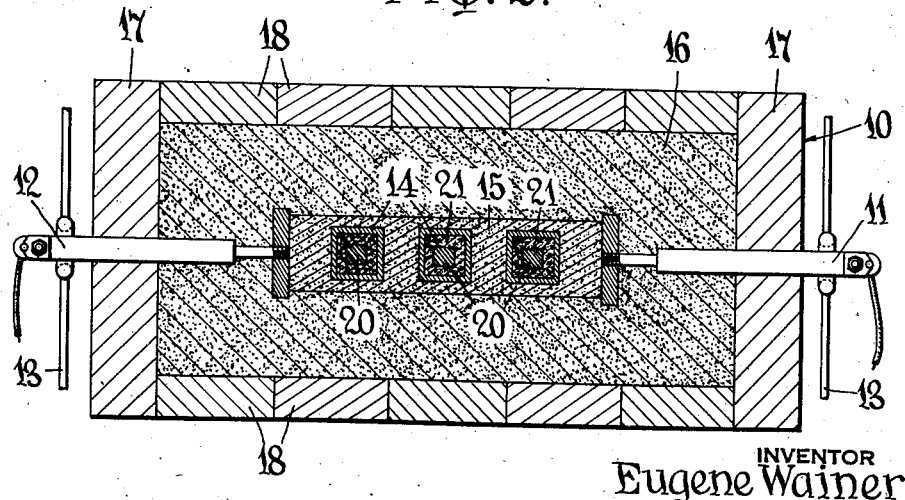

Referring now to the drawing, Figure 1 illustrates a cross sectional elevation of a form of apparatus for carrying this invention into effect; Figure 2 is a cross section taken along the line 2—2 of Figure 1.

The furnace, indicated generally at 10, may be of relatively great length in comparison with its width and height, so that a number of saggers may be placed in series with each other along the length of the furnace. The electrodes 11 and 12 are made of graphite and may be suitably cooled by water as shown at 13. The electrodes extend through openings in the end walls 17 of the furnace. The side walls 18 are built up of loose bricks to permit the free escape of evolved gases. The hearth 19 of the furnace is composed of any suitable material and forms a supporting base for the furnace and its charge.

Between the two electrodes are placed one or more carbon saggers 14 embedded in a mass of resistance carbon 15 constituting the current-carrying resistance core. The core and the electrodes 11 and 12 in turn are surrounded by a mass of heating insulating material 16, such as a mixture of sand and coke, filling the remainder of the furnace and constituting the bed upon which the current-carrying resistance core 15 is placed.

The saggers 14 are composed of carbon (graphite) walls with a bottom and a removable top of the same material. The interior of each sagger contains a zirconium oxide piece 20 to be fired, embedded in a mass of finely-divided zirconium oxide 21 to prevent the formation of too much zirconium carbide in the piece 20.

In the practice of this invention, it has been found that the orientation and location of the zirconium oxide pieces to be fired, with reference to the direction of passage of the current, is of considerable importance. Even though the saggers are suitably placed in the current carrying core and a sufficient amount of embedding zirconia 21 is used in packing the zirconium oxide pieces 20 in the saggers, high yields will not be obtained unless cognizance is taken of this fact. Normally the current starts initially through the bottommost portions of the resistance core 15, due to the tighter packing of the granular carbon conductor in the bottom in view of the greater weight of materials pressed thereon. As this portion heats up, products of decomposition and volatile matter are formed, raising the resistance somewhat due to this evolution and to increase in the porosity of the conductor. The layer immediately above this initially heated bottom layer is still relatively dense and of a lower resistance than the now heated bottom layer, and the current therefore will flow more substantially through this layer than through the bottom layer. This process continues until the volatile matter has been driven out of the core completely. At this point the materials making up the core have been sintered and hardened to a high degree of rigidity and will withstand considerable pressure without compacting and will thus not yield areas of resistance lower than others. For this reason the current now passes uniformly through the entire core. Until this point is reached, however, the non-uniform passage of current will cause one horizontal core layer to become much hotter than the one above, and any ZrO₂ shape in this region will thus be heated non-uniformly. For example, a ZrO₂ rod having great length in comparison with its thickness and packed vertically in the saggers will heat up and shrink to maturation progressively from the bottom to the top, which process very effectively pinches and cracks off each section as it is heated, thus ruining the rod for any further use.

To eliminate this difficulty it has been found that the best yields of properly matured and shrunk ZrO₂ shapes are obtained if the plane exposing the greatest area is positioned in the sagger parallel to the top or bottom of the core, and the plane exposing the least area is positioned in the sagger parallel to the perpendicular sides of the core. Thus positioned, the longest linear distance will be perpendicular to the perpendicular sides of the core. This is particularly true for pieces of wall thickness greater than ¼ inch and holds to a somewhat lesser extent for pieces of wall thickness less than ¼ inch. As an example, in a brick measuring 10″ x 5″ x 1″, the 10″ x 5″ surface will be placed parallel to the bottom, the 10″ x 1″ will be placed perpendicular to the sides, leaving the 5″ x 1″ plane parallel to the sides. The same rules are followed in each case where one dimension of the shape is substantially larger than any other dimension.

It is important that the proper firing temperature be maintained. Underfiring causes the finished piece to lack strength, tightness and durability, while overfiring increases formation of zirconium carbide and causes silicon carbide to be formed where silica is present. After the volatile matter has been driven out, carbon can still be transferred to the interior of the core through successive formation and decomposition of carbides. This transfer is more rapid the higher the temperature, and will take place to such an extent that the embedding zirconia will be unable to prevent excessive amounts of carbon from reaching the shapes. This transfer of carbon through formation and decomposition of carbides becomes particularly important where silica or its derivatives are present. The temperature of decomposition of silica has been determined by a number of investigators, the average of the best of these placing this point at approximately 2250° C. The result is that, at temperatures just below this, silicon carbide is not formed. It has also been found that formation of zirconium carbide or absorption of carbon by the zirconium oxide is not excessive at such temperatures. Accordingly, the temperature should be so regulated that the interior of the saggers does not reach this temperature but is as close as possible thereto, a safe limit being 2200° C.

It is a difficult matter to accurately determine temperatures in resistance furnaces. I have found that the best means of determining the proper temperature is by use of the decomposition point of crystalline granular zirconium silicate. A pellet made of these grains held on the end of a graphite rod is inserted into the interior of the zirconia filled saggers in the center of the furnace. When the temperature is high enough the SiO₂ will begin to distill away from the ZrSiO₄, leaving the originally transparent grains whitish and opaque, the SiO₂ distillation proceeding with rapidity from this point on. At this point the power feeding the furnace should be shut off. At the same time the core has reached a much higher temperature, as is shown by the fact that a similar pellet of coarse crystalline silica is quickly decomposed when placed in the current carrying core outside the saggers. Even though the power has been shut off the temperature inside the saggers will continue to rise for some time, due to transfer of heat from the hot core. However, repeated tests using silica pellets in the sagger interiors show that the temperature never rises above the decomposition point of SiC, when the control using zirconium silicate pellets is used initially.

After cooling, the furnace is unloaded, and the pieces are extracted from the partially carbided embedding zirconia. The fired pieces have a grey to grey black color due to the presence of a small amount of carbon. After the reducing firing it is usually desirable to cool and refire the refractory pieces in an oxidizing atmosphere at a temperature below 1200° C. (e. g. 800° to 1200° C.) to eliminate any carbon that may be absorbed, or zirconium carbide that may be formed. Also, as a matter of convenience, the green pieces before the reducing firing may be heated to a temperature below that at which the allotropic change noted above takes place, and preferably around 900° C. in an oxidizing atmosphere. This preliminary firing hardens the material sufficiently so that it will stand quite rough handling in the reducing firing.

Zirconium oxide compositions fired according to the above procedure do not exhibit the disruption normally encountered at 1000° to 1050° C. Similar compositions fired entirely in oxidizing atmospheres will either break up at 1000° to 1050° C., or break in use due to poor resistance to heat shock. This beneficial effect is observed whether or not the zirconium oxide is bonded with a siliceous bonding agent.

As zirconium oxide is one of the most refractory materials known, and is also unique in its relative chemical inertness at high temperatures, it is seen that the permanent incorporation of materials which detract from these characteristics is undesirable. Consequently, it is preferred in the practice of this invention to employ relatively pure zirconium oxide as the starting material. Although auxiliary bonding agents and other materials of high melting point may be added, it is generally preferred that, if used at all, only small quantities be used. Accordingly, it is preferred that the total quantity of refractory oxides (e. g., melting at above 2000° F.), or compounds of such refractory oxides, such as silicates, or other refractory materials, such as carbides, other than zirconium oxide, present as impurities in the zirconium oxide or water or otherwise added, should not exceed 5 per cent of the zirconium oxide.

However, the incorporation of a limited amount of siliceous bonding agent in zirconium oxide refractories prepared according to the method of the present invention has been found to produce new and unusual effects. When fired in a reducing atmosphere at above 1900° C. and preferably below 2400° C., these siliceous bonding agents are distilled off, leaving a residue of tightly bonded pure zirconium oxide. The reason for this phenomenon is not exactly understood, but a possible explanation is that the silica, in distilling out, sweeps with it other harmful impurities which may be adsorbed or otherwise strongly held within the mass. As stated above, the amount of such bonding agent should not exceed 5 per cent. To obtain the desired effect, the amount of silica, present as such or as compounds of silica, should be at least 0.5 per cent. The silica or other siliceous bonding agent should be finely divided, such as minus 200 mesh or finer.

The siliceous bonding agents which can be used are compounds of oxides of elements of the first four groups of the periodic table, such as the alkali metals, the alkaline earth metals, berllyium, magnesium, zinc, boron, aluminum, titanium and zirconium, with silica. Silica itself is also highly useful. Besides the normal silicates, the silica compositions formed by combination of the above named oxides or their silicates with zirconium silicate are valuable agents. Of these compounds those insoluble in water are preferred in operations involving slip casting or jiggering, while slightly water soluble silicates may be used in ramming or pressing if desired. Combinations of such silicates may be used. Some of the materials which may be used are as follows: talc, forsterite, magnesium zirconium silicate, magnesium aluminum silicate, calcium zirconium silicate, calcium aluminum silicate, calcium titanium silicate, aluminum silicate, zirconium silicate, and others. The siliceous material may be added in whole or in part as a result of the comminution procedure. For example, in milling fused zirconia, a very abrasive material, in porcelain equipment, about 1 to 1½ per cent of porcelain is added during the course of particle size reduction to minus 325 mesh, and somewhat less impurity is introduced in milling to minus 200 mesh. Previously it was thought desirable to eliminate this impurity by milling with iron and subsequently leaching out the iron with acid, but in the practice of the present invention it is a positive advantage to retain this impurity. In some cases the siliceous impurity added by milling in porcelain equipment is sufficient and no further silica need be added.

The invention having been described generally, the following specific examples are now given:

Example 1

—200 mesh porcelain milled electrically fused zirconia_____grams__ 650
—325 mesh porcelain milled electrically fused zirconia_____grams__ 350
Tetrasodium pyrophosphate_____do____ 0.1
Water _____cc__ 150

These ingredients are thoroughly mixed and shaped by slip casting in plaster molds. The piece is first fired to 900° C. in an oxidizing atmosphere, then fired to 2200° C. in an electric furnace as described above, and finally fired in an oxidizing atmosphere at 900° to 1200° C.

Example 2

The same procedure is followed as in Example 1, except that 15 grams of aluminum silicate are incorporated in the starting composition. The aluminum silicate may be replaced by an equal quantity of magnesium aluminum silicate, magnesium silicate, magnesium zirconium silicate, calcium aluminum silicate, calcium zirconium silicate, zirconium silicate, or other silicates.

Example 3

The same procedure is followed as in Example 2, except that 120 cc. of water are used instead of 150 cc., and that the mixture is shaped by jiggering in a plaster mold.

In either Example 2 or Example 3, 0.1 gram of $Na_4P_2O_7$ may be replaced by 0.1 gram of $NH_4OH$, $NaOH$ or $KOH$, plus 0.1 gram of tannic acid, glue or alginic acid.

Example 4

—40 +80 mesh electrically fused zirconia_____grams__ 650
—100 +200 mesh electrically fused zirconia_____grams__ 350
—200 porcelain milled electrically fused zirconia_____grams__ 150
—325 porcelain milled electrically fused zirconia_____grams__ 80
Silicate as in Example 2_____do____ 30
$Na_4P_2O_7$ _____do____ 0.08
Water _____cc____ 125

These ingredients are slip cast and fired as in Example 1. With 100 cc. of water the material may be jiggered.

Example 5

—40 +80 mesh electrically fused zirconia_____grams__ 650
—100 +200 mesh electrically fused zirconia_____grams__ 350
—200 porcelain milled electrically fused zirconia_____grams__ 150
—325 porcelain milled electrically fused zirconia_____grams__ 80
Silicate as in Example 2_____do____ 30
2% gelatin solution_____cc__ 90

These ingredients are mixed, rammed or pressed into shape, and fired as in Example 1.

When parts or percentages are mentioned, parts and percentages by weight are understood. Where the term "refractory oxides other than zirconium oxide" is used, this is understood to include such refractory oxides whether combined or uncombined with other oxides. Where the term "silica" is used in the claims, this is understood to include silica whether combined or uncombined with other oxides.

In the practice of this invention it is not known whether heating of the zirconium oxide pieces in a reducing medium results in the formation of small amounts of zirconium carbide or merely physical absorption of carbon. From the color of the pieces before heating in an oxidizing atmosphere, it is believed that there is merely physical absorption of carbon. However, it is understood of course that the mechanism or theory of what happens does not limit the scope of the invention.

As many variations are possible within the scope of this invention, it is not intended to be limited except as defined by the appended claims.

I claim:

1. A method of forming zirconium oxide refractories of high resistance to thermal shock, comprising forming a composition containing a major quantity of zirconium oxide, with not more than 5 per cent of refractory oxides other than zirconium oxide, molding said composition into shape, and firing the molded shape in a carbonaceous reducing atmosphere at a temperature above 1900° C.

2. A method of forming zirconium oxide refractories of high resistance to thermal shock, comprising forming a composition containing a major quantity of zirconium oxide, with not more than 5 per cent of refractory oxides other than zirconium oxide, molding said composition into shape, and firing the molded shape in the presence of a carbonaceous reducing gas at a temperature between 1900° and 2400° C.

3. A method of forming zirconium oxide refractories of high resistance to thermal shock, comprising forming a composition containing a major quantity of zirconium oxide and 0.5 to 5 per cent of silica, with the total quantity of refractory oxides including silica other than zirconium oxide not exceeding 5 per cent, molding said composition into shape, and firing the molded shape in a reducing atmosphere at a temperature above 1900° C.

4. A method of forming zirconium oxide refractories of high resistance to thermal shock, comprising forming a composition containing a major quantity of zirconium oxide and 0.5 to 5 per cent of silica, with the total quantity of refractory oxides including silica other than zirconium oxide not exceeding 5 per cent, molding said composition into shape, and firing the molded shape in the presence of a carbonaceous reducing gas at a temperature between 1900° and 2400° C.

5. A method of forming zirconium oxide refractories of high resistance to thermal shock, comprising forming a composition containing a major quantity of zirconium oxide, molding said composition into shape, firing the molded shape in an oxidizing atmosphere at a temperature below 1000° C., subsequently firing said molded shape in a reducing atmosphere at a temperature above 1900° C., and finally firing said molded shape in an oxidizing atmosphere at a temperature below 1200° C.

6. A method of forming zirconium oxide refractories of high resistance to thermal shock, comprising forming a composition containing a major quantity of zirconium oxide and 0.5 to 5 per cent of silica, with the total quantity of refractory oxides including silica other than zirconium oxide not exceeding 5 per cent, molding said composition into shape, firing the molded shape in an oxidizing atmosphere at a temperature below 1000° C., subsequently firing said molded shape in the presence of a carbonaceous reducing gas at a temperature between 1900° and 2400° C., and finally firing said molded shape in an oxidizing atmosphere at a temperature below 1200° C.

7. A method of forming zirconium oxide refractories of high resistance to thermal shock, comprising forming a composition containing a major quantity of zirconium oxide, molding said composition into shape, surrounding the molded shape with a finely divided embedding material adapted to partially prevent penetration of carbon and carbonaceous gases to the vicinity of said shape, and heating said molded shape in the core of an electric resistance furnace with carbon acting as the resistor.

8. A method of forming zirconium oxide refractories of high resistance to thermal shock, comprising forming a composition containing a major quantity of zirconium oxide, molding said composition into shape, surrounding the molded shape with a finely divided embedding material adapted to partially prevent penetration of carbon and carbonaceous gases to the vicinity of said shape, placing said shape and embedding material in a carbon sagger, and heating said molded shape in the core of an electric resistance furnace with carbon acting as the resistor at a temperature between 1900° and 2400° C.

9. A method of forming zirconium oxide refractories of high resistance to thermal shock, comprising forming a composition containing a major quantity of zirconium oxide, molding said composition into shape, firing the molded shape in an oxidizing atmosphere at a temperature below 1000° C., surrounding the molded shape with finely divided zirconium oxide, heating said molded shape in the core of an electric resistance furnace at approximately 2200° C., and finally firing said molded shape in an oxidizing atmosphere at a temperature below 1200° C.

10. A method of forming zirconium oxide refractories of high resistance to thermal shock, comprising forming a composition containing a major quantity of zirconium oxide, with not more than 5 per cent of refractory oxides other than zirconium oxide, molding said composition into shape, firing the molded shape in an oxidizing atmosphere at a temperature below 1000° C., surrounding the molded shape with finely divided zirconium oxide, heating said molded shape in the core of an electric resistance furnace at approximately 2200° C., and finally firing said molded shape in an oxidizing atmosphere at a temperature below 1200° C.

11. A method of forming zirconium oxide refractories of high resistance to thermal shock, comprising forming a composition containing a major quantity of zirconium oxide and 0.5 to 5 per cent of silica, with the total quantity of refractory oxides including silica other than zirconium oxide not exceeding 5 per cent, molding said composition into shape, firing the molded shape in an oxidizing atmosphere at a temperature below 1000° C., surrounding the molded shape with finely divided zirconium oxide, heating said molded shape in the core of an electric resistance furnace at approximately 2200° C., and finally firing said molded shape in an oxidizing atmosphere at a temperature below 1200° C.

12. A method of forming zirconium oxide refractories of high resistance to thermal shock, comprising forming a composition containing a major quantity of zirconium oxide, molding said composition into a shape having at least one dimension greater than the other two, embedding said molded shape in an embedding material adapted to partially prevent penetration of carbon and carbonaceous gases to the vicinity of said shape, placing said shape and embedding material in a carbon sagger, orienting the filled sagger in the core of an electric resistance furnace in such a direction that the longest dimension of said molded shape lies in a substantially horizontal position substantially at right angles to a line connecting the electrodes of the electric furnace and the second longest dimension of said molded shape lies in a substantially horizontal position substantially parallel to a line connecting the electrodes of the electric furnace, and passing a current through the core of said furnace.

EUGENE WAINER.